Figure 1:
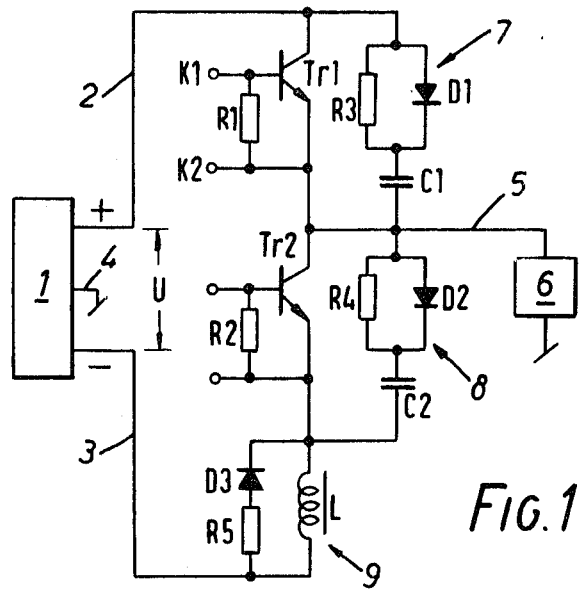

United States Patent [19]

Nygaard

[11] 4,167,776
[45] Sep. 11, 1979

[54] INVERTER CIRCUIT
[75] Inventor: Nils H. Nygaard, Sonderborg, Denmark
[73] Assignee: Danfoss A/S, Nordborg, Denmark
[21] Appl. No.: 947,106
[22] Filed: Sep. 29, 1978

Related U.S. Application Data

[63] Continuation of Ser. No. 816,810, Jul. 18, 1977, abandoned.

[30] Foreign Application Priority Data

Jun. 17, 1977 [DE] Fed. Rep. of Germany ....... 2632381

[51] Int. Cl.² .............................................. H02M 1/18
[52] U.S. Cl. ...................................... 363/56; 363/131; 363/132
[58] Field of Search ................................... 363/16–18, 363/20, 22, 24, 27, 55, 56, 58, 98, 131, 132, 136, 137

[56] References Cited

U.S. PATENT DOCUMENTS

| 3,257,604 | 6/1966 | Colclaser et al. | 363/132 |
| 3,652,874 | 3/1972 | Partridge | 363/124 X |
| 3,750,003 | 7/1973 | Petersen et al. | 363/56 |
| 3,832,573 | 8/1974 | Ver Planck et al. | 363/57 X |
| 3,873,282 | 3/1975 | Finch | 323/24 X |

FOREIGN PATENT DOCUMENTS

| 1402874 | 8/1975 | United Kingdom | 363/131 |
| 318130 | 12/1971 | U.S.S.R. | 363/131 |

*Primary Examiner*—William M. Shoop
*Attorney, Agent, or Firm*—Wayne B. Easton

[57] ABSTRACT

The invention relates to an inverter circuit which includes at least one pair of series connected transistors. The transistors of each pair are switched alternately on and off with a short dead period therebetween to prevent short circuiting. Rapid switching is accompanied by power being converted in each transistor on being switched off which is harmful to the transistor. Known auxiliary circuits disposed respectively parallel with the transistors include capacitors to slow the rise of the collector voltage relative to the drop in emitter current and this provides some protection against damage. Additional protection is attained by providing a choke coil in series with each pair of transistors which retards the charging of the capacitors and the transistor charging current is thereby kept low to prevent or minimize transistor damage.

1 Claim, 2 Drawing Figures

INVERTER CIRCUIT

This is a continuation patent application of Ser. No. 816,810, filed July 18, 1977, now abandoned.

The invention relates to an inverter circuit comprising at least one pair of transistors which are in series between two D.C. voltage supply leads and between which an output branches off to the consumer, the transistors being alternately brought to the conductive state and each lying in parallel with an auxiliary circuit comprising a condenser in series with a parallel circuit consisting of a resistor and a diode poled in the same sense as the pass direction of the transistors.

In a known inverter circuit, such an auxiliary circuit, which is also termed a R-C-D protective circuit, is provided for the following reason. If in a transistor without the auxiliary circuit there is no control voltage at the base, the emitter current drops back to zero suddenly but within a finite time, whilst the collector-emitter voltage increases from a low value to the full size, this again being sudden but within a finite time. Consequently, power is converted in the transistor that can lead to destruction of the transistor in the course of time. By using the auxiliary circuit, the rise in the collector-emitter voltage is retarded in relation to the drop in the emitter current. Consequently the power converted in the transistor on 'switching off' can be kept so low that it is no longer harmful.

Surprisingly, it has been found that despite careful dimensioning of the auxiliary circuit damage occurs to the transistors if these are connected in series in pairs in an inverter. The invention is therefore based on the problem of providing an inverter circuit of the aforementioned kind in which the transistors that are used are more safely protected against damage.

This problem is solved according to the invention in that a supplementary circuit containing a choke is provided in series with the pair of transistors and associated auxiliary circuits.

If in an inverter circuit the transistors are alternately brought to the conductive state, a certain dead period must be provided between 'switching off' the first transistor and 'switching on' the second transistor so that a short circuit path can on no account occur through both transistors between the two supply leads. For safety reasons, this dead period should be chosen to be too long rather than too short. Within the dead period, the D.C. voltage is distributed so that about U/2 is applied to each condenser of the auxiliary circuit. If the one transistor is then brought to the conductive state, the full voltage U will suddenly be applied to the condenser associated with the other transistor. This leads to a correspondingly high charging current which is supplied through the conductive transistor and leads to its rapid break-down. If the path of this charging current is provided with a supplementary circuit containing a choke in accordance with the invention, charging of the condenser will take much longer and the transistor will not be damaged.

Another advantage of the supplementary circuit resides in the fact that a single supplementary circuit will in any case suffice for two transistors with associated auxiliary circuits but possibly for far more transistors with associated auxiliary circuits. The choke can also have additional functions.

Normal operation of the inverter circuit is in no way affected by the choke because its D.C. resistance is very low. It is, however, desirable to have a branch which bridges the choke and contains a diode poled opposite to the pass direction of the transistors. In this way one obtains a circuit through which the choke current can fade out during the dead period.

A resistor may be in series with the diode in the bridging branch. This permits the time constant of the fading-out process to be set. If the resistor is not too large, it may also be in series with the choke and this series circuit bridged by the diode.

Further, it is not necessary for the supplementary circuit to be symmetrical. It is even an advantage if it is provided between one of the D.C. supply leads and one end of the series circuit of a pair of transistors. In this way there will be no influence on the region between the two transistors on the output side and it can be of conventional form.

If two or more pairs of transistors are provided, it is advisable for the supplementary circuit to be in a lead common to the pairs. One supplementary circuit will then suffice for all transistors and associated auxiliary circuits.

Figure 2:
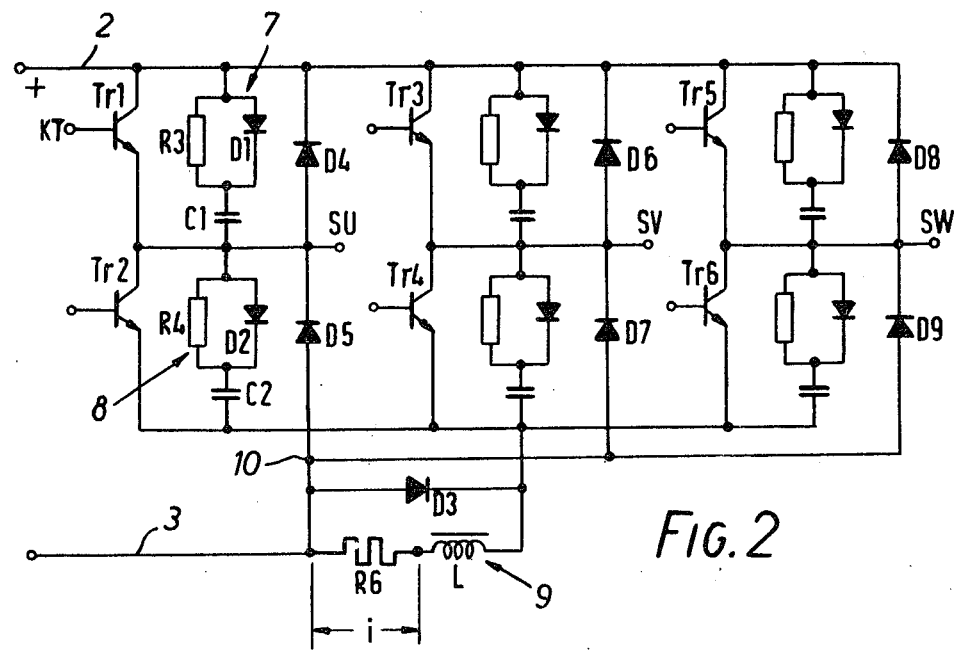

The invention will now be described in more detail with reference to the example shown in the drawing, wherein:

FIG. 1 is a circuit diagram for a two-phase inverter with earthed centre point and, FIG. 2 is a circuit diagram for a three-phase inverter.

In FIG. 1 a regulatable voltage supply 1 is provided from which there extend a supply lead 2 for the positive D.C. voltage, a supply lead 3 for the negative D.C. voltage and an earthed central connection 4.

A first transistor Tr1 and a second transistor Tr2 are in series with their collector-emitter path. The base-emitter path is bridged by a resistor R1 or R2. If a control voltage is applied to two control signal terminals K1 and K2, one of the transistors Tr1 will become conductive. If the control signal is absent, it returns to the blocked condition. The same applies to the transistor Tr2, except that the control signals are applied alternately and there is a dead period between them.

An output 5 branches off between the transistors and between the output and earth an A.C. consumer 6 can be connected.

Parallel to the transistor Tr1 there is an auxiliary circuit 7 and parallel to the transistor Tr2 an auxiliary circuit 8. The auxiliary circuit 7 consists of a series circuit of a condenser C1 and the parallel circuit of a resistor R3 and a diode D1 which has the same pass direction as the transistor Tr1. The auxiliary circuit 8 has the same construction and comprises a condenser C2, a resistor R4 and a diode D2.

In series with the circuit as described comprising the pair of transistors Tr1 and Tr2, there is a supplementary circuit 9 having a choke L and a bridging branch with a resistor R5 and a diode D3 of which the pass direction is opposite to that of the transistors.

Assuming that in operation the transistor Tr1 is conductive and the transistor Tr2 is blocked, then in this condition the condenser C1 is charged to a very low voltage and the condenser C2 to almost the full D.C. voltage U. If, now, the transistor Tr1 is blocked, the emitter current will fade out comparatively rapidly. On the other hand, the collector-emitter voltage will rise more slowly because this takes place in response to the charge on the condenser C1. Accordingly, the power converted in the transistor Tr1 on switching off is so low that the transistor cannot be damaged.

Within the dead period there is a distribution of the voltage such that approximately U/2 is applied to both condensers C1 and C2. If, now, the transistor Tr2 becomes conductive then, in the absence of the supplementary circuit 9, substantially the full D.C. voltage U would be applied to the condenser C1. A strong charging current would flow through the transistor Tr2 and damage same. By reason of the choke L in the supplementary circuit 9, the charging of the condenser C1 is retarded. The corresponding charging current can be kept so low that the transistor Tr2 does not become damaged.

On blocking the transistor Tr2, the conditions are repeated as already described in conjunction with blocking of the transistor Tr1. The current then still flowing in the choke L is short circuited through the resistor R5 and the diode D3 so that the choke current drops rapidly and, on switching the transistor Tr1 on, the choke is again able to keep the charging current sufficiently low, this time for the condenser C2.

In the FIG. 2 embodiment, the same reference numerals as in FIG. 1 are used for the same components. Since this is a three-phase inverter, three pairs of transistors Tr1, Tr2 and Tr3, Tr4 and Tr5, Tr6 are provided, in each case with the associated auxiliary circuits such as 7 and 8. All three pairs of transistors have a common protective circuit 9.

In this protective circuit, a measuring resistor R6 is in series with the choke L. A measuring signal i corresponding to the direct current flowing through the inverter can be tapped from this resistor. The series circuit L and R6 is bridged by the diode D3.

Three outputs 5U, 5V and 5W are provided to which a three-phase consumer such as an asynchronous motor can be connected. Further, there are free-running diodes D4–D9 which operate in the usual manner. The free-running diodes D4, D6 and D8 are provided directly between a respective output and the positive supply lead 2, the free-running diode D5, D7 and D9 are provided between the outputs and a point 10 of the negative supply lead 3 located between the voltage supply 1 and the supplementary circuit 9.

I claim:

1. An inverter circuit comprising a voltage supply and a pair of supply leads, at least one pair of series connected transistors and a supplementary circuit in series with said transistors extending between said supply leads, a consumer load connected to the junction of each pair of said transistors, an auxiliary circuit in parallel with each of said transistors including a capacitor in series with a parallel circuit of a resistor and a diode, said diode being poled to pass current in the same direction as the associated one of said transistors, means operating the two transistors of each said pair of transistors with alternating conducting periods and short nonconducting dead periods respectively between said conducting periods to prevent short circuiting of said consumer load, each said conducting period being accompanied by the full supply voltage being applied across the nonconducting one of said transistors and the associated one of said auxiliary circuits, said supplementary circuit including a choke coil, said choke coil being large enough to substantially reduce the capacitor charging current through the conducting one of said transistors during each of said conducting periods to prevent damage to said transistors.

* * * * *